United States Patent
Lanz

(10) Patent No.: US 8,943,925 B2
(45) Date of Patent: Feb. 3, 2015

(54) BICYCLE BRACKET WITH A TIGHTENING YOKE

(71) Applicant: Look Cycle International, Nevers (FR)

(72) Inventor: Matthieu Lanz, Nevers (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 13/892,445

(22) Filed: May 13, 2013

(65) Prior Publication Data

US 2013/0298720 A1     Nov. 14, 2013

(30) Foreign Application Priority Data

May 11, 2012 (FR) ...................................... 12 54317

(51) Int. Cl.
| B62K 21/18 | (2006.01) |
| B62K 21/12 | (2006.01) |
| B62K 21/14 | (2006.01) |
| B62K 21/16 | (2006.01) |

(52) U.S. Cl.
CPC ................. *B62K 21/18* (2013.01); *B62K 21/12* (2013.01); *B62K 21/14* (2013.01); *B62K 21/16* (2013.01)
USPC ..................................................... 74/551.8

(58) Field of Classification Search
USPC ........ 74/551.1, 551.3, 551.7, 551.8; 403/102, 403/110
See application file for complete search history.

(56) References Cited

U.S. PATENT DOCUMENTS

| 5,436,810 A * | 7/1995 | Sutherland et al. ............ 362/473 |
| 6,058,800 A * | 5/2000 | Giard ............................. 74/551.1 |
| 7,922,136 B2 * | 4/2011 | Lien et al. ................. 248/222.11 |
| 8,177,249 B2 | 5/2012 | Servet |
| 2006/0053954 A1 * | 3/2006 | Tiong ............................ 74/551.8 |
| 2006/0179969 A1 * | 8/2006 | Lin ................................ 74/551.1 |
| 2009/0079160 A1 | 3/2009 | Lai |

FOREIGN PATENT DOCUMENTS

| EP | 0 591 897 | 4/1994 |
| EP | 1 695 900 | 8/2006 |
| EP | 2 248 717 | 11/2010 |
| FR | 1 537 056 | 8/1968 |
| NL | 1 001 155 | 3/1997 |

OTHER PUBLICATIONS

French Search Report dated Jan. 14, 2013, corresponding to the French Priority Application No. 1254317.

* cited by examiner

*Primary Examiner* — Vicky Johnson
(74) *Attorney, Agent, or Firm* — Young & Thompson

(57) ABSTRACT

The bracket includes a bracket body of which the front end ends by a receiving recess that is adapted to the shape of a set of handlebars and that can be closed toward the outside by a tightening yoke that is adapted to the shape of the handlebars. The tightening yoke is connected to the bracket body to tighten the handlebars by a tightening unit. The tightening yoke is formed by a part that is connected in the form of a flexible belt of which a first end is anchored in the bracket body and of which a second end is connected to the tightening unit arranged behind the receiving recess by being capable of pulling the second end close to the first end of the belt forming a tightening yoke in such a way as to adjust the tightening force of the handlebars.

20 Claims, 3 Drawing Sheets

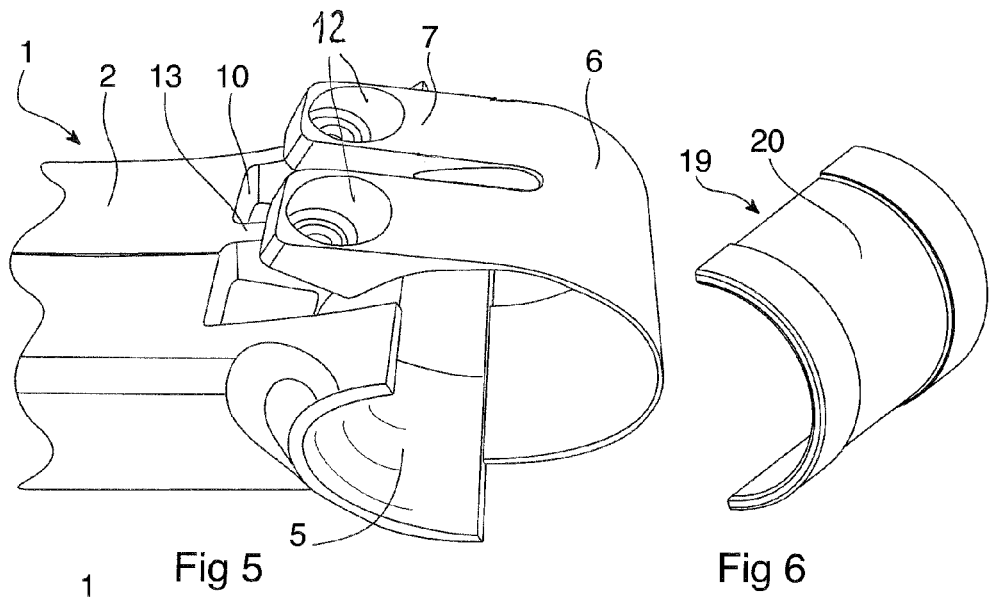
Fig 5   Fig 6
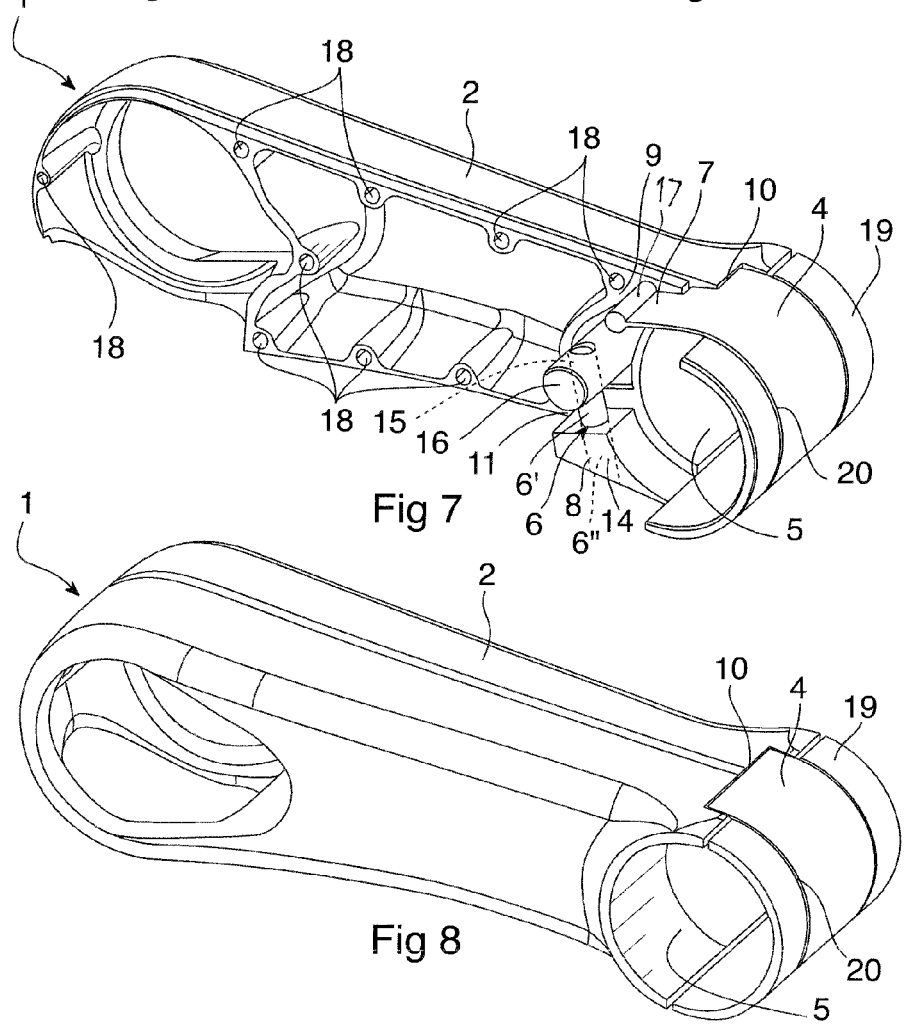
Fig 7
Fig 8

BICYCLE BRACKET WITH A TIGHTENING YOKE

FIELD OF THE INVENTION

This invention relates to a bicycle bracket with a tightening yoke. At one of its ends, the bracket is attached to the upper part of a pivoting tube mounted to rotate in a steering socket of a bicycle frame, and at its opposite end, it supports the set of handlebars of the bicycle that is tightened using a tightening yoke.

BACKGROUND OF THE INVENTION

Such a bicycle bracket is known from, for example, EP2248717 of the applicant. The end of the bracket that supports the set of handlebars ends by a recess for receiving that is adapted to the shape of the handlebars. This receiving recess can be closed toward the outside by the tightening yoke that is also adapted to the shape of the handlebars and connected to the bracket body for tightening the handlebars using tightening means between the end of the bracket and the yoke that together define essentially a tubular element that may or may not be circular based on the cross-section of the handlebars (see in particular FIG. 9 of this document).

The document EP2248717 describes two variants of such a semi-cylindrical tightening yoke, namely a first variant in which the yoke is attached at the end of the bracket using tightening means comprising tightening screws, and a second variant in which on one side, the yoke is mounted in an articulated manner on the end of the bracket and, on the other side, is connected to the bracket using a tightening screw. The first variant is also described in US2009079160 and the second variant is described in EP1695900.

Other brackets that are described in the documents NL 1 001 155, FR 1537056 and EP 0 591 897 are also known. These brackets are not provided with a yoke like the one that is described in the document EP2248717. The free front end of the bracket body is curved at the rear here in such a way as to define a slot on the lower surface of the bracket body. Play for adjusting the space around the handlebars is thus obtained, and the tightening of the handlebars can be adjusted using a tightening screw that makes it possible to reduce the width of the slot by pulling the free end close to the lower surface of the bracket body.

It is noted that the bracket body according to one or the other of these three documents thus has means for tightening the handlebars that are relatively rigid and that in any case cannot open toward the outside to allow the installation, from the front, of a set of handlebars that has an aerodynamic shape with a variable width along its axis (of the type illustrated in FIG. 1 of the application).

SUMMARY OF THE INVENTION

One object of the invention is to propose a bracket with a tightening yoke that can provide improved aerodynamics to the yoke-handlebar unit by being perfectly integrated with the rest of the bicycle. The tightening yoke according to the invention can be adapted to any dimension of the handlebars that in general has a cylindrical shape. In addition, the tightening yoke according to the invention is lighter than those that are currently known.

Another object of the invention is to propose a yoke that makes it possible to assemble in advance the handlebars with the yoke or else to open the latter enough to be able to install the set of handlebars by inserting it from the front and not from the side, which is the only possibility offered by the brackets described in these last three documents.

The object of the invention is a bicycle bracket with a tightening yoke comprising a bracket body of which one end is adapted to be attached to a pivoting tube of a bicycle and of which the opposite end ends by a receiving recess that is adapted to the shape of a set of handlebars and that can be closed toward the outside by a tightening yoke that is adapted to the shape of the handlebars and connected to the bracket body to tighten the handlebars in the receiving recess using tightening means, characterized in that said tightening yoke is formed by a part that is connected in the form of a flexible belt of which a first end is anchored in the bracket body and of which a second end is connected to said tightening means arranged in a cavity of the bracket body behind said receiving recess by being capable of pulling said second end close to said first end of the belt forming a tightening yoke in such a way as to adjust the tightening force is formed by a flexible belt of the handlebars.

According to other characteristics of the invention:
Said second end of the belt that forms a tightening yoke is connected directly to said first end of the belt that forms a tightening yoke by said tightening means that at the same time carry out the anchoring of said first end in the bracket body;
Said tightening means comprise at least one tightening screw working with a threaded hole that is provided at said second end;
Said first end of the belt that forms a tightening yoke extends into the bracket body by passing through a first opening of said cavity and is connected to a holding element that extends transversely into said cavity, with said second end of the belt forming a tightening yoke being arranged in a second opening of said cavity that is opposite to said first opening and has at least one through hole that receives a tightening means comprising a tightening screw, whereby said tightening screw is able to work with a threaded hole that is made in a transverse part that is arranged in said cavity;
A rigid plate with a shape that is adapted to that of the handlebars is placed on the inside surface of the belt that forms the tightening yoke;
In the middle of its surface turned toward the outside, said plate has a central groove that extends from one edge to the other and is capable of receiving the belt that forms the tightening yoke;
The second and first ends of the belt forming a tightening yoke have excess thickness;
The belt that forms a tightening yoke is a metal belt;
The belt that forms a tightening yoke is made of a composite material; and
The composite material comprises fibers and a polymerized resin.

BRIEF DESCRIPTION OF THE DRAWINGS

Other characteristics and advantages of the invention will emerge from the following description of two non-limiting embodiments of the invention, with reference to the accompanying figures, in which:

FIG. 5 is a perspective view showing a tightening yoke according to the invention at the time of its assembly in the bracket body;

FIG. 6 is a perspective view showing a plate that is designed to be placed on the inside surface of the tightening yoke according to the invention;

FIG. 7 is a perspective view showing one-half of a bracket in two parts equipped with a tightening yoke according to the invention;

FIG. 8 is a perspective view showing the bracket in two parts after assembly;

DETAILED DESCRIPTION OF THE INVENTION

In the figures, the identical or equivalent elements will bear the same references.

Bracket 1 comprises a bracket body 2 that is a hollow body, preferably made of compressed carbon.

The rear end of the bracket body 2 is equipped with means for attaching the bracket 1 to the top end of a fork pivoting tube (not shown). These attachment means are not shown in the figures since they do not relate directly to the invention. For more details, see the example that is described in EP 2248717 of the applicant.

Figure 1:
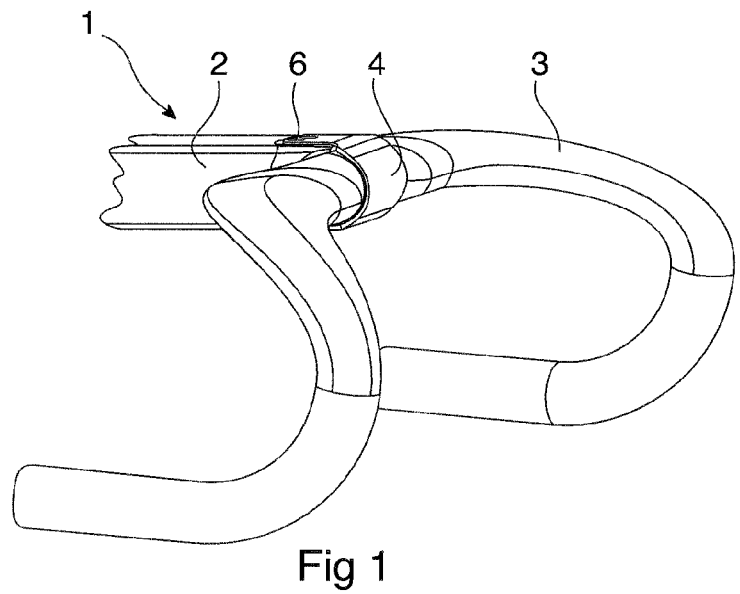
FIG. 1 is a perspective view showing the front end of a bracket that is equipped with a tightening yoke according to the invention in the process of tightening a set of handlebars.
Figure 2:
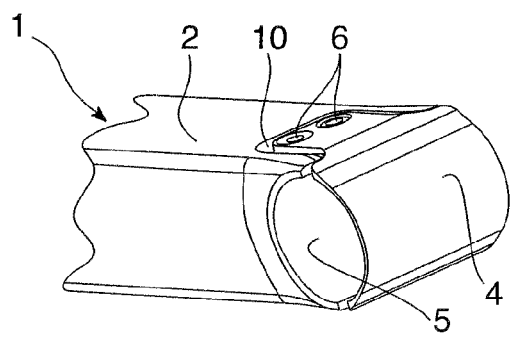
FIG. 2 is a perspective view corresponding to FIG. 1, without a set of handlebars.
Figure 3:
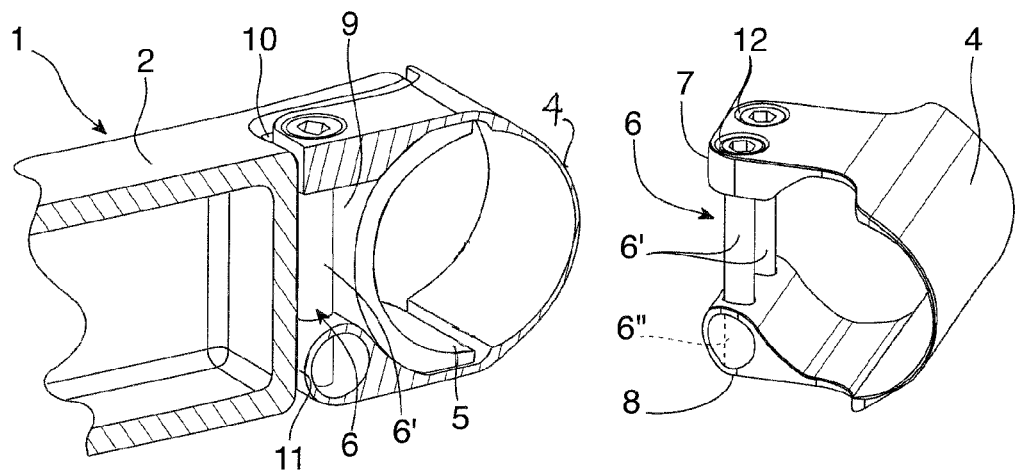
FIG. 3 is a longitudinal cutaway and perspective view showing a tightening screw inside the bracket body.
Figure 4:
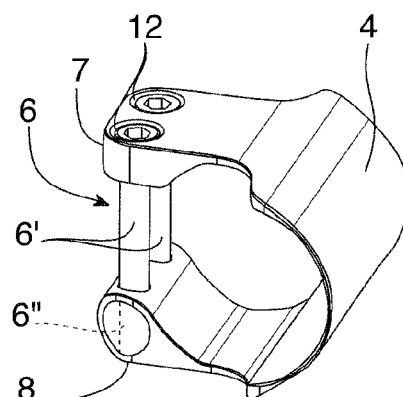
FIG. 4 shows a perspective view of a first embodiment of the tightening yoke according to the invention.

The invention is located at the opposite end of the bracket 1, i.e., the end at which a set of handlebars 3 is kept tightened using a tightening yoke 4 (see FIG. 1) that is connected at this end.

This opposite end ends by a receiving recess 5 that is adapted to the shape of a set of handlebars. This receiving recess 5 can be closed toward the outside by the tightening yoke 4 that is also adapted to the shape of the set of handlebars. These two elements in some way grip the handlebars in a vise. With the assistance of tightening means 6, the tightening yoke 4 is connected to the bracket body 2 to tighten the set of handlebars 3 by stressing it in the receiving recess 5.

According to a significant characteristic of the invention, the tightening yoke 4 is formed by a part that is connected in the form of a flexible belt of which a first end 7 is anchored in the bracket body 2 and of which a second end 8 is connected to the tightening means 6. It is therefore a separate element relative to the bracket body, and this element can thus be made of a material that is different from that of the bracket body as is explained in more detail below.

The tightening means 6 comprises at least one screw, and in the illustrated example two screws, 6' arranged inside the bracket body 2. The screws 6' extend over essentially the entire height of the bracket 1 by being arranged in a cavity 9 that is formed centrally behind an end wall delimiting the receiving recess 5. The cavity 9 is open toward the top by a first opening 10 and toward the bottom by a second opening 11 opposite to the first opening. These first and second openings make it possible to receive the ends 7, 8 of the belt 4.

The flexible belt that forms the yoke 4 is relatively thin, on the order of 1 mm, and has significant excess thickness at the first and second ends 7, 8, on the one hand for forming housings 12 for the screw heads, and on the other hand for providing threaded holes 6" there that work with the respective screws.

The screws are thus capable of pulling the second end 8 close to the first end 7 of the belt 4 in such a way as to adjust the force for tightening the handlebars so as to achieve secure and very reliable tightening.

FIG. 5 is a view that corresponds to the view 3 at the time of assembly of the tightening means. Here, the first end of the belt 4 is equipped with a central longitudinal slot 12, and the first opening 10 is equipped with a central wall 13 that passes through the slot 12 when the elements are assembled.

According to this embodiment, it is also possible first of all to put the belt that forms a yoke 4 in the manner of a clip on the central part of the handlebars to then attach this yoke-handlebar unit to the front end of the bracket.

FIG. 7 shows one-half of a bracket in two parts, and FIG. 8 shows this bracket after assembly of the two parts.

According to this second embodiment, the first end 7 of the belt 4 is always anchored in the bracket body 2, whereas the second end 8 comprises through holes that receive tightening means in the form of screws 6' that are screwed into threaded holes provided in a transverse part 16 arranged in the cavity 9 of the pedal body 2.

The transverse part 16 preferably has a cylindrical shape and is mounted in the cavity 9 with the possibility of rotation to be put into an optimal position for the installation of screws 6'.

The first end 7 of the belt that forms a tightening yoke 4 ends by excess thickness that in the illustrated example has the shape of a small cylinder 17 that is sized in such a way that it cannot go out through the first opening and thus operates as an element for holding the first end 7 of the belt in the cavity 9.

To attach the handlebars 3 in the yoke 4, first the small cylinder 17 is installed, and then the flexible belt that forms the yoke 4 is opened to insert into it, from the front, the central part of the handlebars. Next, the handlebars are tightened using screws 6'.

In the example illustrated in FIG. 7, half the bracket is equipped on its junction surface with a number of holes 18 that are capable of receiving corresponding tenons (not shown) provided on the junction surface of the other half. The two parts can then be connected by gluing or welding based on the material of the bracket.

In the embodiment shown in FIGS. 7 and 8, a rigid plate 19 of a shape that is adapted to that of the handlebars 3 is arranged on the inside surface of the tightening yoke 4.

On its surface that is turned toward the outside, this rigid plate 19 advantageously has a central groove 20 that extends from one edge to another and that is capable of receiving the belt that forms the tightening yoke 4. Preferably, the depth of the central groove 20 essentially corresponds to the thickness of the belt in such a way that the latter is arranged flush with the outside surface of the plate 19.

Figure 9:
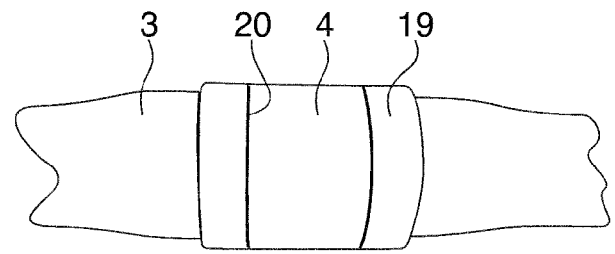
FIG. 9 is a front view illustrating the aspect of a tightening yoke according to the invention in the process of tightening a set of handlebars.

Thus, and thanks to the presence of this plate 19, the extension of the belt that forms the tightening yoke 4 around the handlebars 3 is done without angles and perfectly continuous shapes are obtained, as emerges from these figures, as well as from FIG. 9, which is a front view of a set of handlebars 3 mounted on the bracket according to the invention.

Figure 10:
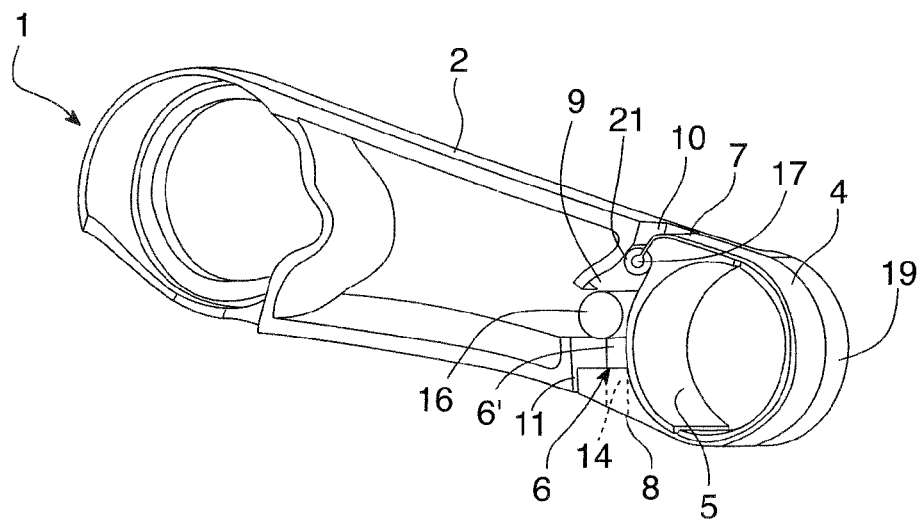
FIG. 10 is a perspective and cutaway view showing a bracket in a single part equipped with a tightening yoke according to the invention.
Figure 11:
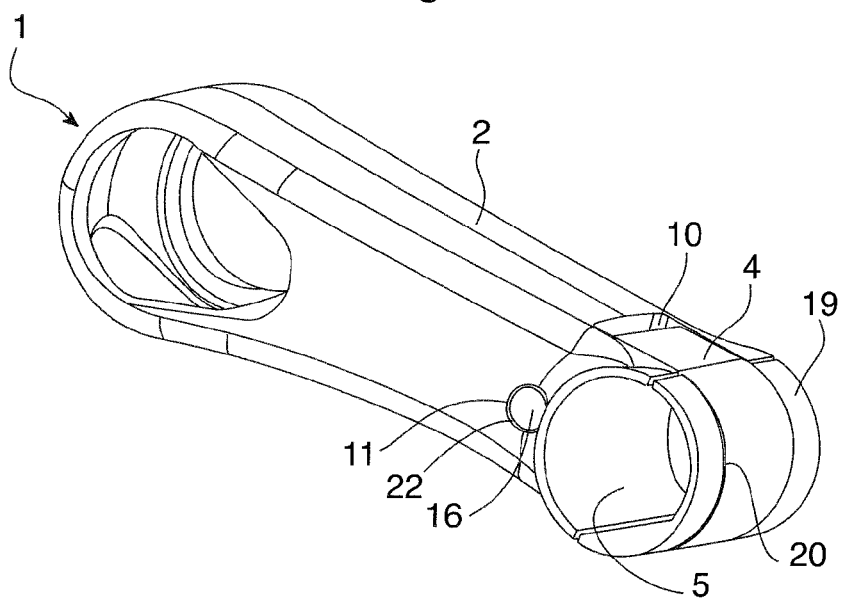
FIG. 11 is a perspective view showing the overall bracket in a single part of FIG. 10.

Finally, FIGS. 10 and 11 show a variant of the second embodiment in which the bracket is made of a single part that furthermore is very similar to the bracket made in two parts shown in FIGS. 7 and 8.

For the assembly of tightening means on this one-piece bracket, the first end 7 of the belt that forms the tightening yoke 4 is introduced via the first opening 10, and it is brought out through the second opening 11; a slotted tubular element 21 is then hooked onto the small cylinder 17 at the end of the first end 7 of the belt 6. The first opening 10 of the cavity 9 of the bracket body is sized in such a way that the first end 7 that is equipped with the slotted tubular element 21 is thus held in the cavity. All of the other elements are the same as those already described in reference to FIGS. 7 and 8.

The belt that forms a tightening yoke 4 can be metal, preferably made of steel, but it can also be produced from aluminum or any other suitable metal.

Composite materials can also be used in the belt that forms a tightening yoke 4, such as fibers in combination with a polymerized resin.

The belt that forms a tightening yoke 4 can also be made of fibers without resin, such as fibers of carbon, glass, aramid, flax, etc.

A bicycle bracket whose front end has simple and aesthetic aerodynamic shapes is thus obtained, thanks to the invention.

Of course, the invention is not limited to the examples that are illustrated and described, and one skilled in the art will be able to provide different variants of these embodiments without thereby exceeding the scope of the invention.

The invention claimed is:

1. A bicycle bracket, comprising:
a bracket body of which one end is adapted to be attached to a pivoting tube of a bicycle;
a receiving recess at an opposite end of the bracket body, that is adapted to a shape of a set of handlebars;
a tightening yoke configured to close the receiving recess toward an outside, that is adapted to the shape of the handlebars and connected to the bracket body; and
means for tightening adapted to tighten the handlebars in the receiving recess, wherein
said tightening yoke is formed by a part that is connected in the form of a flexible belt of which a first end is anchored in the bracket body and of which a second end is connected to said means for tightening arranged in a cavity of the bracket body behind said receiving recess by being capable of pulling said second end to said first end of the belt forming said tightening yoke in such a way as to adjust a tightening force of the handlebars.

2. The bicycle bracket according to claim 1, wherein said second end of the belt that forms said tightening yoke is connected directly to said first end of the belt that forms said tightening yoke by said means for tightening that at the same time carry out anchoring of said first end in the bracket body.

3. The bicycle bracket according to claim 2, wherein a rigid plate with a shape that is adapted to that of the handlebars is placed on an inside surface of the belt forming said tightening yoke.

4. The bicycle bracket according to claim 2, wherein the second and first ends of the belt that form said tightening yoke have excess thickness.

5. The bicycle bracket according to claim 2, wherein the belt that forms said tightening yoke is a metal belt.

6. The bicycle bracket according to claim 2, wherein said means for tightening comprise at least one tightening screw working with a threaded hole that is provided at said second end.

7. The bicycle bracket according to claim 6, wherein a rigid plate with a shape that is adapted to that of the handlebars is placed on an inside surface of the belt forming said tightening yoke.

8. The bicycle bracket according to claim 6, wherein the second and first ends of the belt that form said tightening yoke have excess thickness.

9. The bicycle bracket according to claim 6, wherein the belt that forms said tightening yoke is a metal belt.

10. Bicycle bracket according to claim 1, wherein said first end of the belt that forms said tightening yoke extends into the bracket body by passing through a first opening of said cavity and is connected to a holding element that extends transversely into said cavity, with said second end of the belt forming said tightening yoke being arranged in a second opening of said cavity that is opposite to said first opening and has at least one through hole receiving said means for tightening comprising a tightening screw, with said tightening screw being capable of working with a threaded hole made in a transverse part arranged in said cavity.

11. The bicycle bracket according to claim 10, wherein a rigid plate with a shape that is adapted to that of the handlebars is placed on an inside surface of the belt forming said tightening yoke.

12. The bicycle bracket according to claim 10, wherein the second and first ends of the belt that form said tightening yoke have excess thickness.

13. The bicycle bracket according to claim 1, wherein a rigid plate with a shape that is adapted to that of the handlebars is placed on an inside surface of the belt forming said tightening yoke.

14. The bicycle bracket according to claim 13, wherein the second and first ends of the belt that form said tightening yoke have excess thickness.

15. The bicycle bracket according to claim 13, wherein in a center of a surface of the rigid plate turned toward the outside, said rigid plate has a central groove extending from one edge to another and is capable of receiving the belt that forms the tightening yoke.

16. The bicycle bracket according to claim 15, wherein the second and first ends of the belt that form said tightening yoke have excess thickness.

17. The bicycle bracket according to claim 1, wherein the second and first ends of the belt that form said tightening yoke have excess thickness.

18. The bicycle bracket according to claim 1, wherein the belt that forms a tightening yoke is a metal belt.

19. The bicycle bracket according to claim 1, wherein the belt that forms said tightening yoke is made of a composite material.

20. The bicycle bracket according to claim 19, wherein the composite material comprises fibers and a polymerized resin.

* * * * *